March 2, 1937.                J. I. THOMSON                 2,072,778
                       AUTOMOBILE SPRING ARRANGEMENT
                          Filed June 3, 1935        3 Sheets-Sheet 1
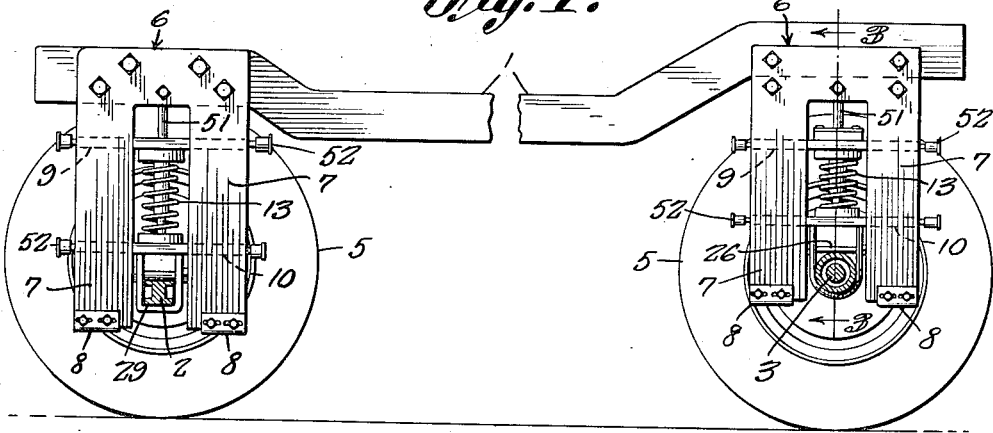
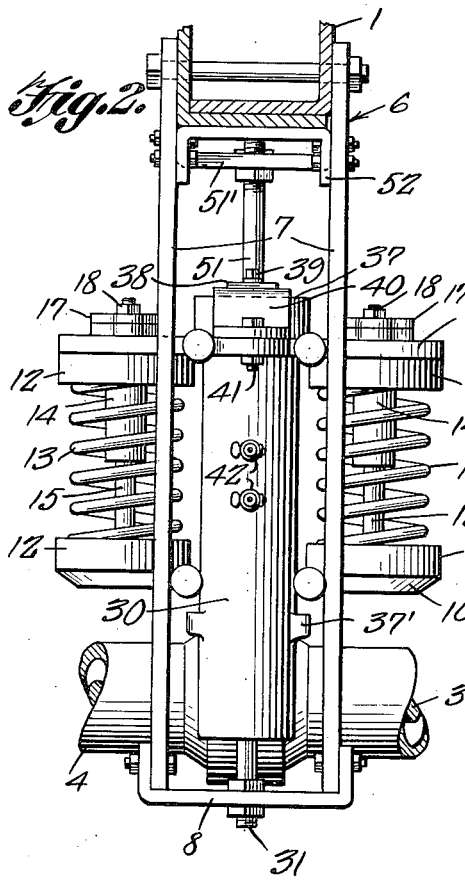
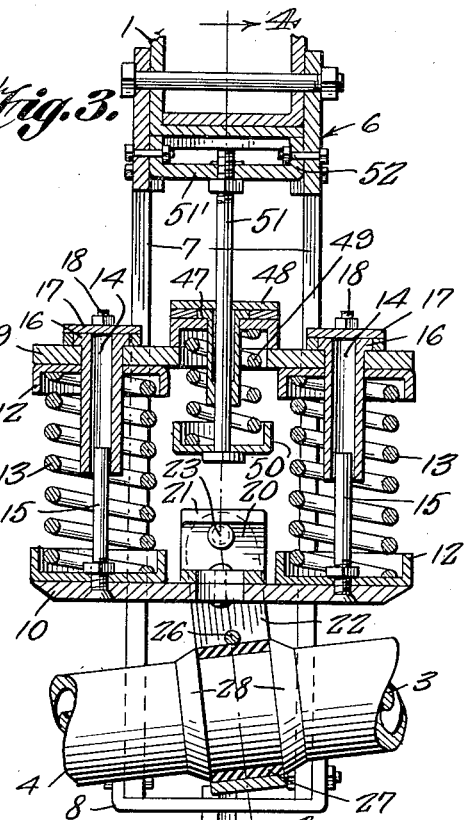
John I. Thomson,
INVENTOR
BY Victor J. Evans & Co.
ATTORNEY

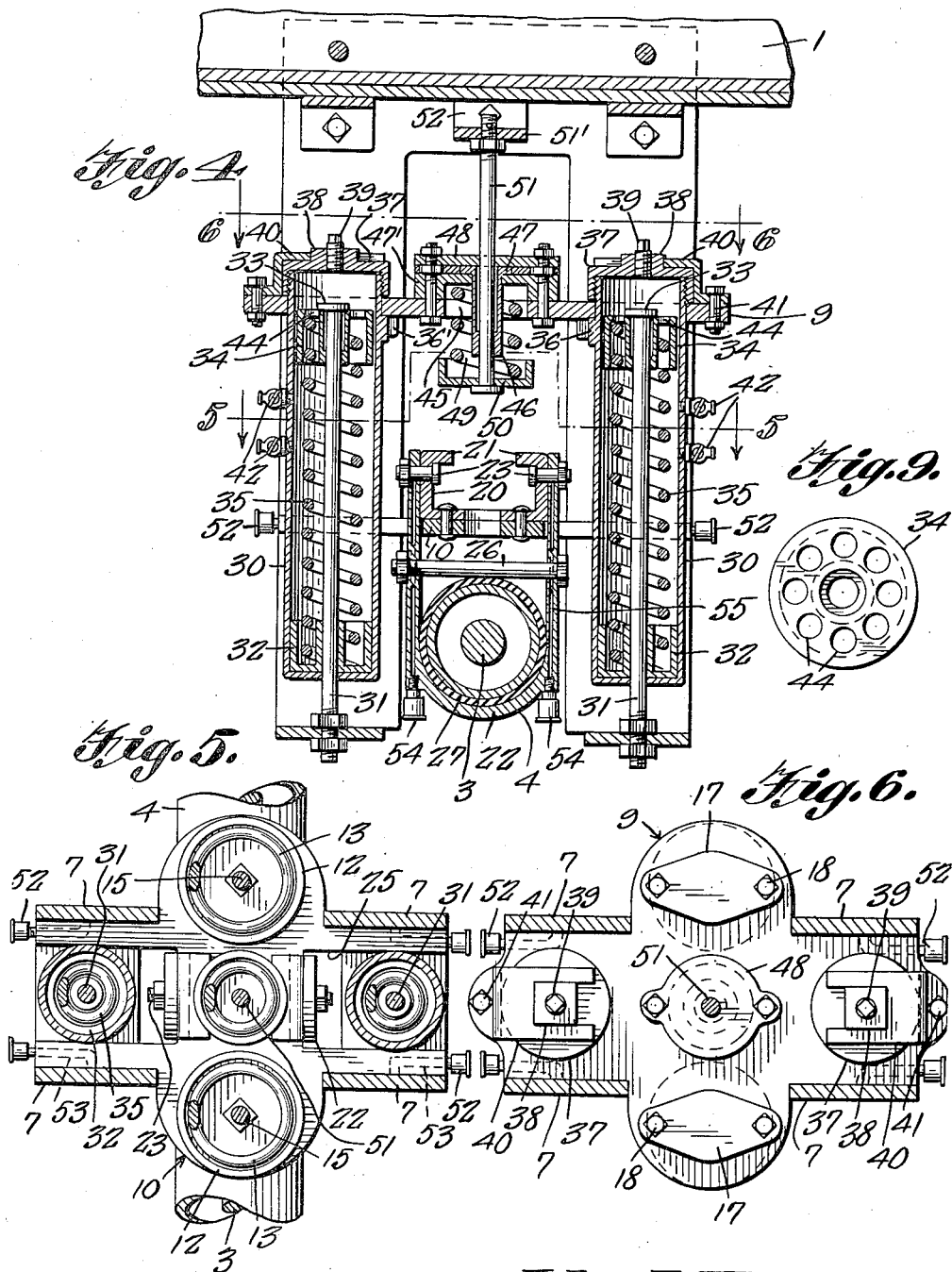

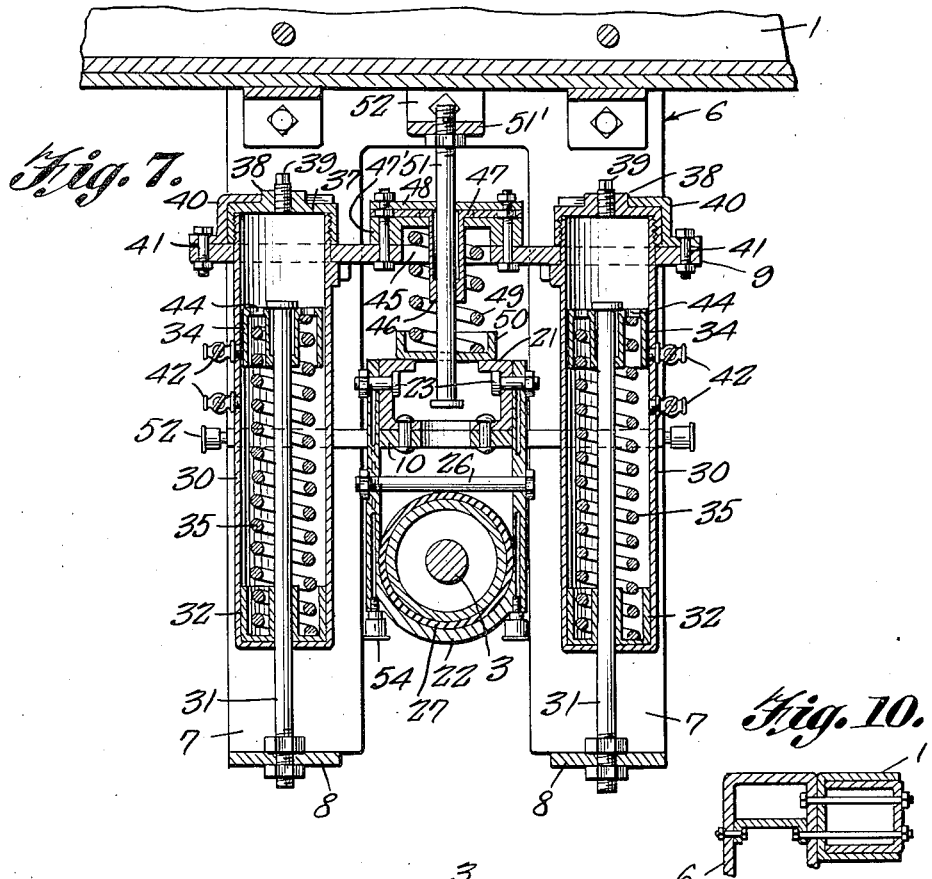
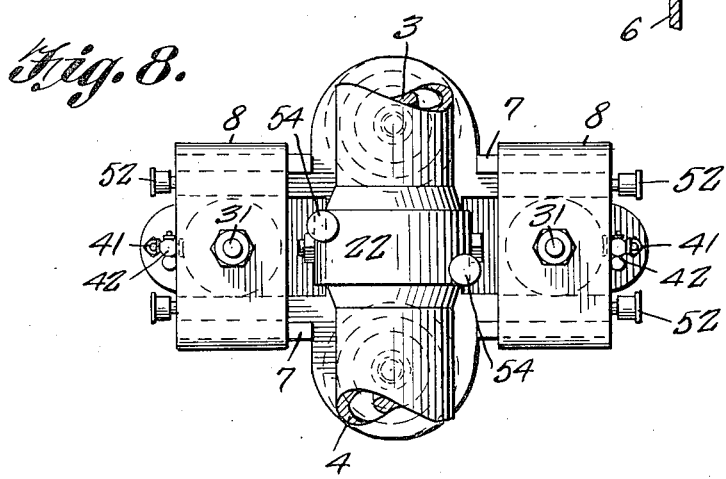

Patented Mar. 2, 1937

2,072,778

UNITED STATES PATENT OFFICE 2,072,778

AUTOMOBILE SPRING ARRANGEMENT

John I. Thomson, East Chicago, Ind.

Application June 3, 1935, Serial No. 24,745

6 Claims. (Cl. 267—60)

This invention relates to cushioning devices for automobiles and like vehicles and has for the primary object the provision of a device of this character which may be readily adapted to a vehicle chassis frame and the axles thereof and will efficiently absorb road shocks and be free of spring rebound action and will maintain the vehicle frame level and permit the axles to move upwardly and downwardly without imparting vibration to the vehicle frame and also permit the ends of the axles to move upwardly and downwardly during travel of the wheels of said axles over irregularities of a road.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating my invention adapted to a vehicle chassis frame and the front and rear axles thereof.

Figure 2 is a fragmentary front elevation, partly in section, illustrating one of the cushioning devices connected to the chassis frame and to the rear axle.

Figure 3 is a sectional view taken on the line 3—3 of Figure 1 showing the connection of the cushioning device to the rear axle to permit up and downward movement of the ends of the axle.

Figure 4 is a sectional view taken on the line 4—4 of Figure 3.

Figure 5 is a sectional view taken on the line 5—5 of Figure 4.

Figure 6 is a sectional view taken on the line 6—6 of Figure 4.

Figure 7 is a view similar to Figure 4 showing the device in the act of cushioning or absorbing road shocks.

Figure 8 is a fragmentary bottom plan view illustrating the device.

Figure 9 is a plan view illustrating one of the spring seats or caps employed in the device.

Figure 10 is a fragmentary sectional view showing a modification of the invention.

Referring in detail to the drawings, the numeral 1 indicates a vehicle chassis frame equipped with front and rear axles 2 and 3, the rear axle 3 being encased in an axle housing 4. The wheels of the vehicle are indicated at 5. The foregoing description relates to a well known construction of vehicle chassis and the axles thereof are connected to the frame 1 by my invention which acts to absorb road shocks between the axle and frame and will maintain the frame level regardless of the movements of the axles in an upward and downward direction. As the cushioning devices are similarly constructed, reference to one specifically is thought sufficient.

A hanger 6 is bolted or otherwise secured to the frame 1 and includes opposed depending side plates 7 each bifurcated to straddle the axle of the vehicle. The bifurcated portions of the side plates are connected at their lower ends by brackets 8. Slidably mounted between the depending side plates are upper and lower plates 9 and 10, both having extensions 11 slidably received between the bifurcated portions of the depending side plates and provide seats to be engaged by spring cups 12 which receive the ends of coil springs 13. Tubular guide sleeves 14 extend through the upper plates and slidably receive rods 15 secured to the lower plate 10. The upper ends of the guide sleeves 14 are flanged, as shown at 16, and rest upon the upper face of the upper plate 9. A retaining cap or element 17 overlies the flanged ends of the guide sleeves 14 and is detachably secured to the upper plate 9, as shown at 18. The guide sleeves maintain the upper spring cups 12 in position on the upper plate 9 while the rods 15 maintain the lower spring cups in position on the lower plate 10.

A channel iron bracket 20 is secured to the upper face of the lower plate 10 and has formed integrally therewith opposed abutment flanges 21. An axle saddle 22 of yoke formation is pivoted to the bracket 20, as shown at 23, with the arm portions 24 thereof depending downwardly through slots or cutout portions 25 formed in the lower portion. The axle saddle 22 receives therein the vehicle axle, the latter being retained in the saddle by a tie bolt 26 extending through the arm portions 24 thereof. The saddle 22 being pivoted to the bracket 20 will permit the axle to rock, as suggested in Figure 3, so that the ends of said axle may move upwardly and downwardly. The saddle 22 which is adapted to the rear axle housing 4 carries an annular cushion block 27 fitting between spaced flanges 28 formed on the axle housing. The saddle 22 which receives the front axle is equipped with cushion blocks 29 engaging in the channels of the front axle.

The upper and lower plates 9 and 10 have sliding contact with the depending bifurcated side plates of the hanger and extending through the slotted portions 25 of the lower plate 10 are cylinders 30 which receive therein rods 31 adjustably secured to the brackets 8 of the hanger. The lower ends of the cylinders have positioned therein spring cups 32 through which the rods 31 extend and the upper ends of said rods are provided with heads 33 engaged by upper spring cups 34 mounted on said rods and slidable within the cylinders. Coil springs 35 surround the rods and engage in the upper and lower cups 34 and 32. The cylinders extend upwardly through openings in the upper plate and are provided with lugs 36 engageable with the under face of the upper plate to limit the upward movement of the cylinders with respect to the upper plate and also contact lugs 36' on the upper plate to prevent turning of the cylinders. Stop lugs 37' are formed on the cylinders and are located a distance below the lower plate and are engaged by the latter should excessive movement of the upper and lower plates be had away from each other. Caps 37 close the upper ends of the cylinders and each are provided with a boss 38 having a screw threaded bore normally closed by a screw threaded plug 39. The bosses 38 have angularly related faces engaged by slotted plates 40 shaped to conform to the contour of the cap and are secured to the upper plate 9, as shown at 41. The plates 40 retain the caps on the cylinders and the plugs 39 may be removed to permit lubricant to be placed in the cylinders, the latter being provided with spaced petcocks 42 providing gages to determine the amount of lubricant in the cylinders. The cylinders should be filled with lubricant to a height between the petcocks. The upper spring cups 34 are provided with a series of openings 44 to permit free passage of lubricant through the cups during the movement of the upper cups and cylinders relative to one another. Suitable packing may be placed between the lower spring cups 32 and the rods to prevent loss of lubricant.

The upper plate 9 has an opening 45 through which extends a tubular guide 46 flanged at its upper end, as shown at 47. The flanged end of the guide 46 rests on a retaining plate 47 mounted upon the upper plate 9 and overlying the opening 45. A plate 48 overlies the flanged end of the guide sleeve and is apertured with the aperture thereof aligning with the bore of the guide sleeve and said plate 48 is bolted or otherwise secured to the plate 47 with said bolts extending through the upper plate 9 and having nuts threaded thereon which contact the plate 47 and the plate 48. The plate 47 cooperates with the guide sleeve 46 in forming an upper spring seat or cap for the upper end of a coil spring 49 to engage, the lower end of the spring 49 seating against a lower cap 50. The lower cap is mounted on a rod 51, the latter extending through the guide sleeve and the aperture of the plate 48 and is secured to the offset portion 51' of a bracket 52. The guide sleeve only has a limited contact with the rod 51 so as to provide a lubricant space for the reception of a suitable lubricant whereby the rod and sleeve will be kept lubricated. The bracket 52 is secured to the hanger in close proximity to the vehicle frame 1. The purpose of the spring 49 is to check rebound or upward movement of the vehicle frame 1. Also, it is to be noted that when the springs 13 and 35 have been compressed in absorbing road shocks that the lower cap 50 will move into engagement with the abutment flanges 21 so that a further upward movement of the lower plate, due to excessive road shock, will be against the action of the spring 49 thus permitting said spring to absorb the shock. The lower plate 10 and the bracket 20 have aligned openings through which the headed end of the rod 51 may pass when the spring 39 is being acted upon by the lower plate through the bracket 20 engaging the lower spring cap 50.

Lubricant cups 52' having lubricant ducts 53 are mounted to the upper and lower plates for directing lubricant onto the depending side bifurcated plates of the hanger so that the movement of the upper and lower plates 9 and 10 relative to the hanger will be with a minimum amount of friction.

In operation, the springs 13 act to absorb small or minimum road shocks and when they have been compressed by a road shock of a maximum nature, the springs 35 then absorb the shock. Thus between the springs 13 and 35 road shocks are absorbed and prevented from being directed to the frame of the vehicle and the hanger, consequently providing efficient riding qualities to the vehicle. Also, the arrangement of the springs will maintain the vehicle frame level while the axles at the ends thereof may move upwardly and downwardly due to the wheels 5 passing over irregularities in the roadway.

The axle saddles are equipped with lubricant cups 54, the ducts 55 of which direct lubricant to the pivots 23.

The side plates of the hanger engage opposite faces of the vehicle frame, as shown in Figures 2 and 3, and are bolted or otherwise secured thereto. However, should space be limited in the vehicle frame then the hanger may be secured to a single side face of the vehicle frame, as shown in Figure 10.

Having described the invention, I claim:

1. A cushioning device for vehicles comprising a hanger secured to a vehicle frame and straddling an axle, upper and lower plates slidably mounted to the hanger, means for lubricating the plates and the hanger, cushioning means between the upper and lower plates, cushioning means between the upper plate and the hanger, and means pivotally connecting the axle to the lower plate.

2. A cushioning device for vehicles, comprising a hanger secured to a vehicle frame and straddling an axle, upper and lower plates slidably mounted to the hanger, upper and lower spring cups engaging said plates, coil springs seated in the upper and lower cups, cushioning means connecting the upper plate to the hanger, and means pivotally connecting the axle to the lower plate.

3. A cushioning device for vehicles comprising a hanger secured to a vehicle frame and straddling an axle, upper and lower plates slidably mounted to the hanger, cushioning means between the upper and lower plates, cylinders secured to the upper plate and slidable through the lower plate, rods secured to the hanger and entering the cylinders, cups secured to said rods in said cylinders, cups engaging the lower ends of the cylinders, coil springs positioned between the cups of the cylinders and the rods, and means pivotally connecting the lower plate to the axle.

4. A cushioning device for vehicles comprising a hanger secured to a vehicle frame and straddling an axle, upper and lower plates slidably mounted to the hanger, cushioning means between the upper and lower plates, cylinders secured to the upper plate and slidable through the lower plate, rods secured to the hanger and entering the cylinders, cups secured to said rods in said cylinders, cups engaging the lower ends of the cylinders, coil springs positioned between the cups of the cylinders and the rods, removable means on said cylinders to permit lubricant to be placed therein, and means pivotally connecting the lower plate to the axle.

5. A cushioning device for vehicles comprising a hanger secured to a vehicle frame and straddling an axle, upper and lower plates slidably mounted to the hanger, cushioning means between the upper and lower plates, cylinders secured to the upper plate and slidable through the lower plate, rods secured to the hanger and entering the cylinders, cups secured to said rods in said cylinders, cups engaging the lower ends of the cylinders, coil springs positioned between the cups of the cylinders and the rods, a bracket secured to the lower plate, a spring saddle pivoted to said bracket and secured to the axle.

6. A cushioning device for vehicles comprising a hanger secured to a vehicle frame and straddling an axle, upper and lower plates slidably mounted to the hanger, cushioning means between the upper and lower plates, cylinders secured to the upper plate and slidable through the lower plate, rods secured to the hanger and entering the cylinders, cups secured to said rods in said cylinders, cups engaging the lower ends of the cylinders, coil springs positioned between the cups of the cylinders and the rods, a bracket secured to the lower plate, a spring saddle pivoted to said bracket and secured to the axle, abutment flanges formed on said bracket, a spring seat carried by the upper plate, a rod secured to the hanger and extending through the spring seat and terminating below the upper plate, a spring cup carried by said last-named rod, and a cushioned coil spring interposed between the spring seat and the last-named cup and adapted to be compressed by the last-named cup contacting the abutment flanges.

JOHN I. THOMSON.